United States Patent
Moon et al.

(10) Patent No.: US 10,801,647 B2
(45) Date of Patent: Oct. 13, 2020

(54) TAILOR-LAYERED TUBE WITH THICKNESS DEVIATIONS AND METHOD OF MANUFACTURING THE SAME

(71) Applicant: Pusan National University Industry—University Cooperation Foundation, Busan (KR)

(72) Inventors: Younghoon Moon, Busan (KR); Sangwook Han, Busan (KR); Taewoo Hwang, Busan (KR); Youngyun Woo, Busan (KR); Ilyeong Oh, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 126 days.

(21) Appl. No.: 16/243,324

(22) Filed: Jan. 9, 2019

(65) Prior Publication Data
US 2020/0200296 A1 Jun. 25, 2020

(30) Foreign Application Priority Data
Dec. 20, 2018 (KR) .......................... 10-2018-0166733

(51) Int. Cl.
*F16L 9/00* (2006.01)
*B21D 39/04* (2006.01)

(52) U.S. Cl.
CPC ............... *F16L 9/00* (2013.01); *B21D 39/04* (2013.01)

(58) Field of Classification Search
CPC ................................. G01F 1/42; F22B 37/74
(Continued)

(56) References Cited

U.S. PATENT DOCUMENTS 5,560,398 A * 10/1996 Pfleger .................... F16L 11/12
138/121
5,588,468 A * 12/1996 Pfleger .................... F16L 11/11
138/121
(Continued)

FOREIGN PATENT DOCUMENTS

KR 10-0283366 B1 4/2001
KR 10-2008-0111922 A 12/2008
(Continued)

OTHER PUBLICATIONS

Korean Office Action for related KR Application No. 10-2018-0166733 dated Jan. 28, 2020 from Korean Intellectual Property Office.

*Primary Examiner* — Patrick F Brinson
(74) *Attorney, Agent, or Firm* — Paratus Law Group, PLLC

(57) ABSTRACT

A tailor-layered tube, includes an inner tube, an outer tube having a greater diameter than the inner tube and disposed outside the inner tube, and at least one intermediate tube disposed between the inner tube and the outer tube and having a length different from the inner tube and the outer tube to be locally disposed between the inner tube and the outer tube. The inner tube, the intermediate tube, and the outer tube are hydroformed in a state of being laminated so that the inner tube, the intermediate tube, and the outer tube are sequentially brought into close contact with each other in a region where the intermediate tube is disposed and the inner tube is brought into direct contact with the outer tube in a region where the intermediate tube does not exist, and accordingly regions having locally different thicknesses are successively arranged.

3 Claims, 10 Drawing Sheets

(58) Field of Classification Search
USPC .......................................... 138/141, 140, 137
See application file for complete search history.

(56) References Cited

U.S. PATENT DOCUMENTS

| | | | | |
|---|---|---|---|---|
| 5,918,643 | A | * | 7/1999 | Roloff .................. F16L 11/045 |
| | | | | 138/137 |
| 8,091,588 | B2 | * | 1/2012 | Burke, II .................. F16L 9/02 |
| | | | | 138/143 |

FOREIGN PATENT DOCUMENTS

| KR | 10-2014-0102019 A | 8/2014 |
|---|---|---|
| KR | 10-1459870 B1 | 11/2014 |

* cited by examiner (A)

(B)

(A)

(B)

TAILOR-LAYERED TUBE WITH THICKNESS DEVIATIONS AND METHOD OF MANUFACTURING THE SAME

CROSS-REFERENCE TO RELATED APPLICATION

This application claims priority to and the benefit of Korean Patent Application No. 10-2018-0166733, filed on Dec. 20, 2018, the disclosure of which is incorporated herein by reference in its entirety.

BACKGROUND

The present disclosure relates to a tube having thickness deviations, and more specifically, to a tailor-layered tube manufactured by hydroforming to have thickness deviations and a method of manufacturing the same.

A tube hydroforming process is a process technique that forms a tube by applying a hydrostatic pressure to an interior of the tube and at the same time applying a compressive load in an axial direction of the tube to gradually generate plastic deformation according to a shape of an outer mold. The tube hydroforming has difficulties in manufacturing tubular components having locally different properties (thickness, strength, and mechanical properties).

To solve these difficulties, as shown in FIG. 1, tubes having different thicknesses or different materials are welded to each other to manufacture a tailor welded tube (TWT), and then the TWT is hydroformed to manufacture tubular components having locally different properties.

Further, Korean Patent Registration No. 10-0283366 discloses "a beam using a tailored welded blank and a hydroforming process and a method of manufacturing the same", in which a plurality of plates having different thicknesses or different materials are coupled to each other by laser welding to manufacture tailor welded blanks, an edge portion of a tailor welded blank in which an injection hole is formed and an edge portion of a tailor welded blank in which the injection hole is not formed are hermetically coupled to each other by welding, and the tailor welded blanks which are coupled to each other by welding are fixed to a jig and then a liquid having a certain pressure is inserted thereinto through the injection hole thereof to form the tailor welded blanks into desired shapes.

The TWT hydroforming method satisfies all the advantages of tube hydroforming and tailor welded blanks, and thus is applied in many industrial fields, but has disadvantages in that there is a potential risk of defects due to the presence of welded joints. When the welded tube is hydroformed, there is a risk of damage to a welded portion due to movement of a weld line, and such a defect may cause damage to the mold or deterioration of formability of final products.

SUMMARY

The present disclosure is directed to providing a tailor-layered tube having thickness deviations by using hydroforming without performing welding, and a manufacturing method capable of easily manufacturing the metal tube.

According to an aspect of the present disclosure, there is provided a tailor-layered tube which has thickness deviations, the tailor-layered tube including: an inner tube; an outer tube which has a greater diameter than the inner tube and is disposed outside the inner tube; and at least one intermediate tube which is disposed between the inner tube and the outer tube and has a length different from the inner tube and the outer tube so that the intermediate tube is locally disposed between the inner tube and the outer tube, wherein, the inner tube, the intermediate tube, and the outer tube are hydroformed in a state of being laminated, such that the inner tube, the intermediate tube, and the outer tube are sequentially brought into close contact with each other in a region where the intermediate tube is disposed, and the inner tube is brought into direct contact with the outer tube in a region where the intermediate tube does not exist, and accordingly the tailor-layered tube has a structure in which regions having locally different thicknesses are successively arranged.

According to a first embodiment of the present disclosure, the intermediate tube may be laminated by being positioned to be biased at one side portion of the inner tube and the outer tube.

According to a second embodiment of the present disclosure, the two intermediate tubes may be laminated by being positioned at both sides of the inner tube and the outer tube with a certain distance therebetween.

According to another aspect of the present disclosure, there is provided a method of manufacturing a tailor-layered tube, the method including: an operation S1 of inserting an inner tube in an outer tube and inserting an intermediate tube between the outer tube and the inner tube to align at a predetermined position; an operation S2 of placing a laminate of an outer tube, an inner tube and an intermediate tube in a cavity of a mold; and an operation S3 of supplying a fluid to an inside of the inner tube through one side portion of the cavity of the mold at a constant process pressure so that a pressure is applied to an inner peripheral surface of the inner tube, and simultaneously applying loads to both end portions of the laminate in an axial direction to perform a hydroforming.

The process pressure of the fluid supplied in the operation S3 may be obtained by sequentially performing calculating yield starting pressures at which the inner tube, the intermediate tube, and the outer tube respectively start plastic deformation, determining a first forming pressure calculation formula of a two-layered tube laminate and a second forming pressure calculation formula of a three-layered tube laminate from the yield starting pressures, determining an average pressure having a stress ratio $\alpha$ of 0.5 to 1.0 as a forming pressure from the first forming pressure calculation formula and the second forming pressure calculation formula, and determining an average value of the forming pressure calculated in the first forming pressure calculation formula and the forming pressure calculated in the second forming pressure calculation formula as the process pressure of the fluid, the pressure is applied to an inner peripheral surface of the inner tube by the process pressure of the fluid determined in the hydroforming process.

The axial direction load applied in the operation S3 may be obtained by sequentially performing calculating $S_1$ and $S_2$ which are the distances at which both end portions of a two-layered tube laminate and a three-layered tube laminate are contracted when only an internal pressure of the fluid is applied to an interior of the tube in a state in which no axial direction load for the axial feeding is applied to end portions of the tube, calculating Path-2L and Path-3L, which are load paths of the two-layered tube laminate and the three-layered tube laminate, using the calculated distances $S_1$ and $S_2$ and process pressures, and determining a path having an average value of the load paths Path-2L and Path-3L as an optimal load path.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION

Figure 1:
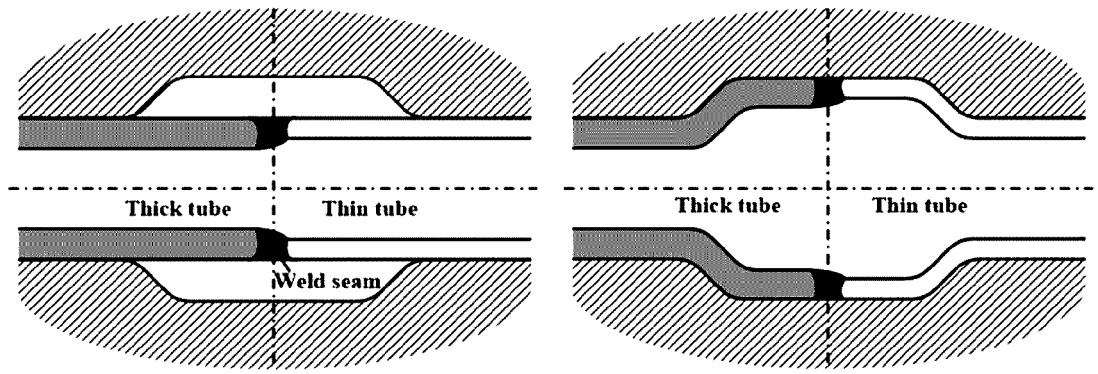
FIG. 1 is a cross-sectional view illustrating states of a conventional tailor welded tube (TWT) before and after hydroforming.

Exemplary embodiments described in the specification and configurations illustrated in the drawings are simply the most preferable embodiments of the present disclosure, and thus it should be understood that various modified examples which can replace them are present at the time when the present disclosure is filed.

Hereinafter, a tailor-layered tube and a method of manufacturing the same will be described in detail with reference to the following embodiments with reference to the accompanying drawings. Throughout the drawings, same reference numbers indicate the same components.

Figure 2:
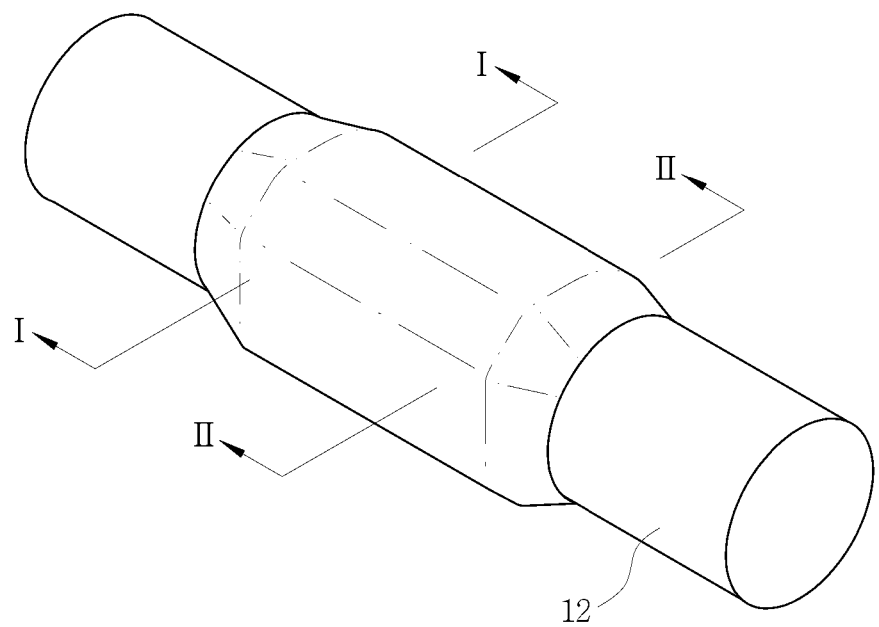
FIG. 2 is a perspective view of a tailor-layered tube according to one embodiment of the present disclosure.
Figure 3A:
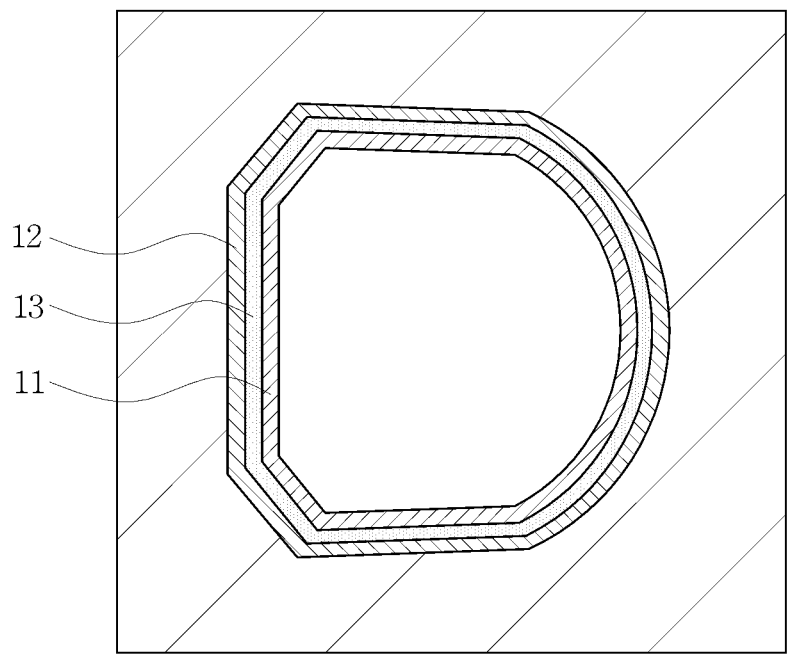
FIG. 3A is a cross-sectional view taken along line I-I of FIG. 2.
Figure 3B:
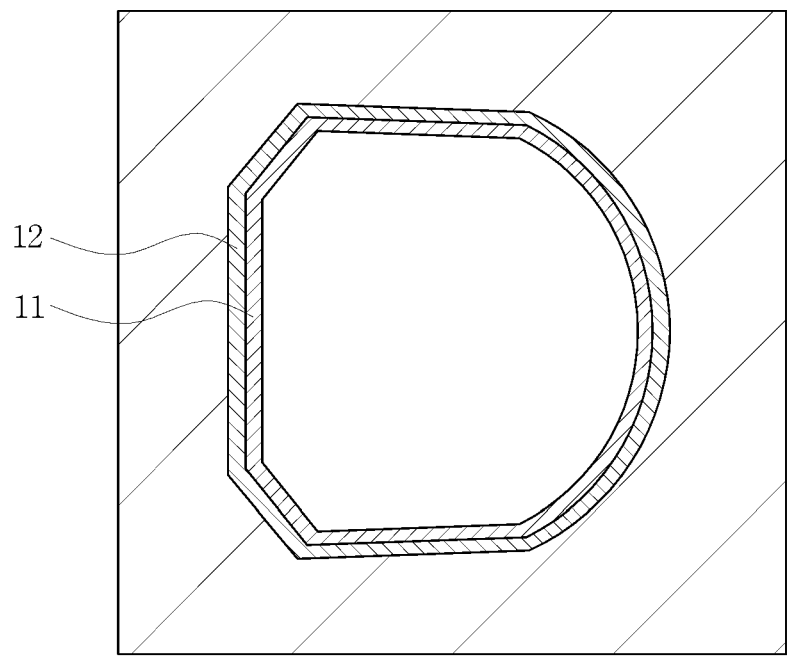
FIG. 3B is a cross-sectional view taken along line II-II of FIG. 2.
Figure 4:
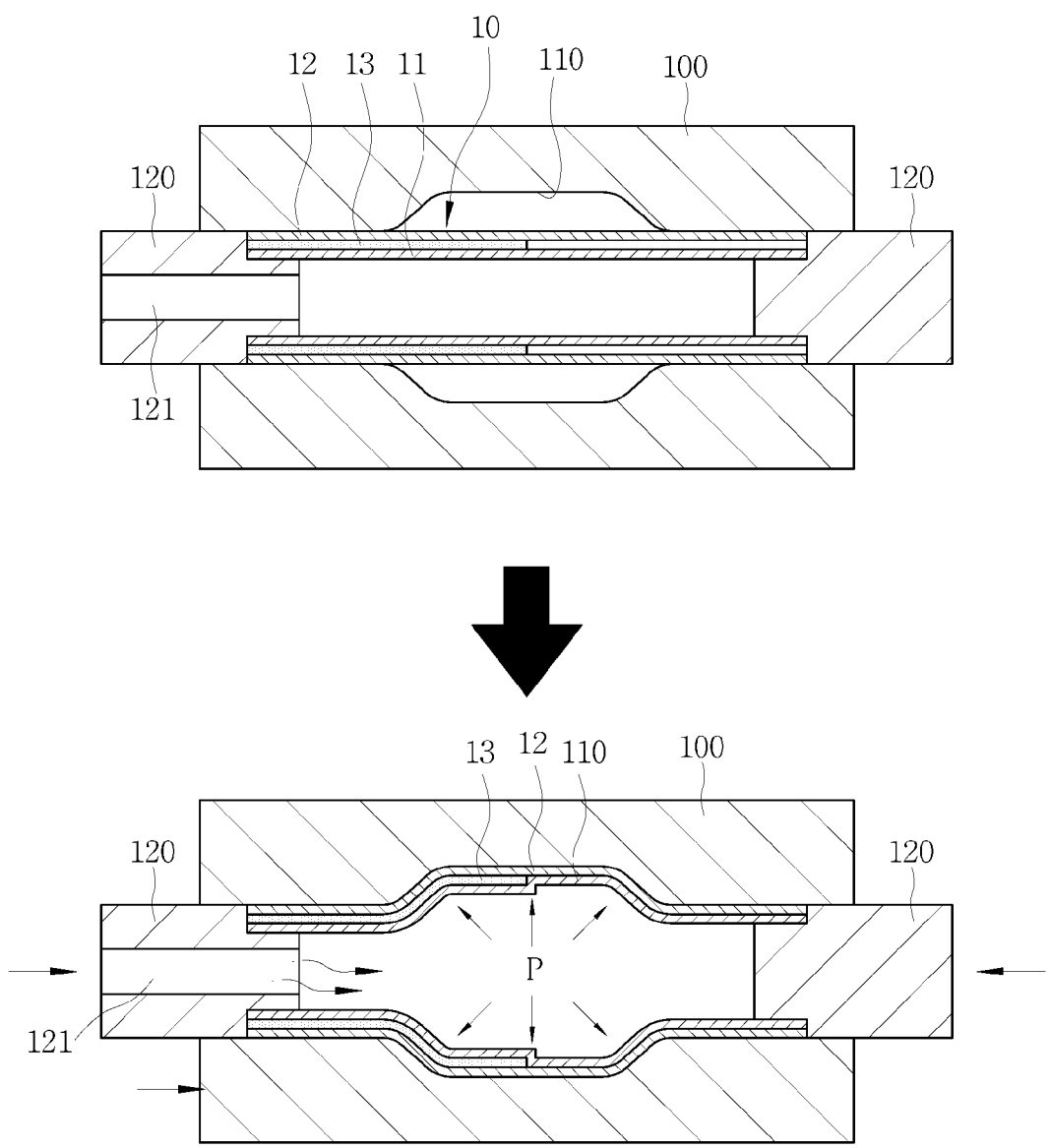
FIG. 4 is a cross-sectional view illustrating states of a tailor-layered tube according to a first embodiment of the present disclosure before and after hydroforming.

FIGS. 2 to 4 illustrate the tailor-layered tube according to one embodiment of the present disclosure, and the tailor-layered tube has local thickness deviations.

Referring to FIGS. 2 to 4, the tailor-layered tube of the present disclosure includes an inner tube 11, an outer tube 12 which has a greater diameter than the inner tube 11 and is disposed outside the inner tube 11, and at least one intermediate tube 13 which is disposed between the inner tube 11 and the outer tube 12 and has a length different from the inner tube 11 and the outer tube 12 to be locally disposed between the inner tube 11 and the outer tube 12. Further, the inner tube 11, the intermediate tube 13, and the outer tube 12 are hydroformed in a state of being laminated so that the inner tube 11, the intermediate tube 13, and the outer tube 12 are sequentially brought into close contact with each other in a region where the intermediate tube 13 is disposed and the inner tube 11 is brought into direct contact with the outer tube 12 in a region where the intermediate tube 13 does not exist, and accordingly regions having locally different thicknesses are successively arranged.

In the embodiment, a region where the thickness of the tailor-layered tube is changed is in a region where the tube is expanded, and the expanded region may have a non-cylindrical shape as shown in FIG. 2.

Before the hydroforming, the inner tube 11, the outer tube 12, and the intermediate tube 13 may have a cylindrical tube shape having a constant diameter. However, after the hydroforming, the inner tube 11, the outer tube 12 and the intermediate tube 13 may be deformed while parts thereof are expanded, and thus may have various shapes such as a cylindrical shape, an elliptical shape, a polygonal shape, or the like.

FIG. 4 illustrates states of the tailor-layered tube before and after the hydroforming, and the tailor-layered tube of the present disclosure has locally different thicknesses by locally changing the number of overlapping tubes and hydroforming.

That is, a tube laminate 10 is prepared by laminating the inner tube 11 and the outer tube 12 with the intermediate tube 13 interposed therebetween in a portion where the thickness is relatively thick and by laminating only the inner tube 11 and the outer tube 12 in a portion where the thickness is relatively thin. After that, the overlapped tube laminate 10 is placed in a cavity 110 of a mold 100 for the hydroforming, and then a fluid is supplied to an inside of the inner tube 11 to apply a certain process pressure to the inner tube 11 in a radial direction and simultaneously a load of a punch 120 is applied to both end portions of the tube laminate 10 in an axial direction to hydroform the tube laminate 10. Then, a three-layered portion of the inner tube 11, the intermediate tube 13, and the outer tube 12 and a two-layered portion of the inner tube 11 and the outer tube 12 are brought into close contact with a surface the cavity 110 while being expanded radially outward to form the tube laminate 10 into a desired shape.

Figure 5A:
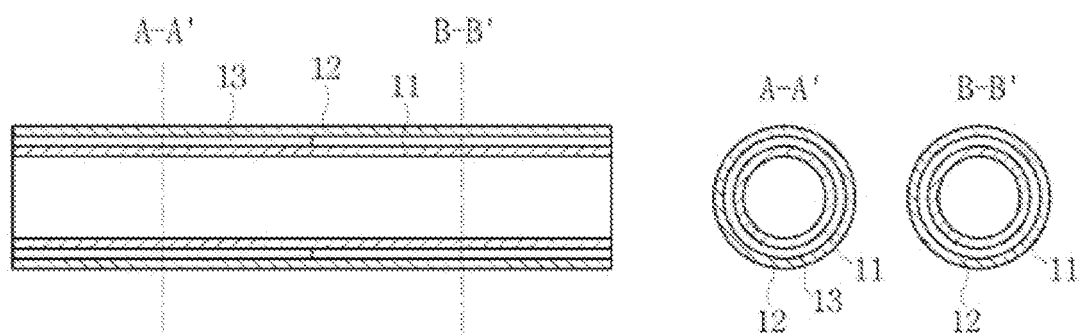
FIG. 5A is a cross-sectional view illustrating an initial state of the tailor-layered tube according to the first embodiment of the present disclosure before hydroforming.
Figure 5B:
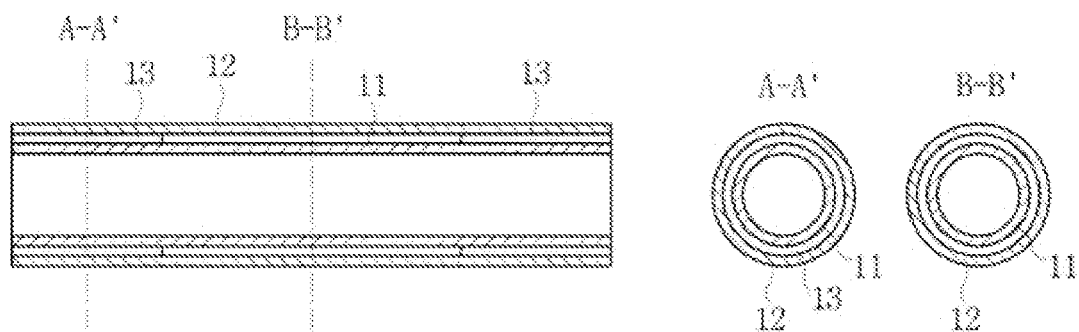
FIG. 5B is a cross-sectional view illustrating an initial state of a tailor-layered tube according to a second embodiment of the present disclosure before hydroforming.

FIGS. 5A and 5B illustrate embodiments showing states of the tailor-layered tube before the hydroforming, and a first embodiment shown in FIG. 5A has a structure in which an intermediate tube 13 is laminated while being positioned biased to one side portion of an inner tube 11 and an outer tube 12, and a tailor-layered tube having a thickness deviation of 3 layers/2 layers (thick layer/thin layer) as shown in FIGS. 2 to 4 is formed after hydroforming.

Further, a second embodiment shown in FIG. 5B has a structure in which two intermediate tubes 13 are laminated while being positioned at both sides of an inner tube 11 and an outer tube 12 with a certain distance therebetween and a tailor-layered tube having a thickness deviation of 3 layers/2 layers/3 layers (thick layer/thin layer/thick layer) is formed after hydroforming.

A method of manufacturing the tailor-layered tube having local thickness deviations by laminating a plurality of tubes is performed through the following processes.

The inner tube 11 is inserted into the outer tube 12, and the intermediate tube 13 is inserted between the outer tube 12 and the inner tube 11 and disposed at a predetermined position. Here, the intermediate tube 13 is aligned at a portion to be relatively thickened.

In addition, as shown in FIG. 4, the laminate of the outer tube 12, the inner tube 11, and the intermediate tube 13 laminated as described above is placed on the cavity 110 of the mold 100, and a pair of punches 120 are installed at both end portions of the cavity 110 so as to be connected to both end portions of the tube laminate.

Next, the fluid is supplied to the inside of the inner tube 11 through a fluid inlet 121 of the punch 120 installed at one side portion of the cavity 110 at a constant process pressure so that a pressure is applied radially outward to an inner peripheral surface of the inner tube 11, and simultaneously loads are applied to both end portions of the tube laminate in an axial direction through the punches 120 to perform the hydroforming.

As described above, the tailor-layered tube has local thickness deviations by locally interposing the intermediate tube 13 at a portion where the thickness should be relatively thick and hydroforming, and thus the number of tubes laminated in the cavity 110 of the mold 100 performing the hydroforming is locally different. Accordingly, when the process pressure of the fluid and axial feeding are not precisely controlled during the hydroforming, the tube may not completely come into contact with a surface of the cavity 110 or wrinkles may be formed in the tube, so that the tube may not be formed into a desired shape, and many defects may occur.

Thus, the present disclosure sets the process pressure of the fluid and the load for axial feeding for hydroforming of the tailor-layered tube as follows.

First, the process pressure of the fluid supplied into the inner tube 11 is calculated by sequentially performing operations of calculating yield starting pressures at which the inner tube 11, the intermediate tube 13, and the outer tube 12 respectively start plastic deformation, determining a first forming pressure calculation formula of the two-layered tube laminate and a second forming pressure calculation formula of the three-layered tube laminate from the yield starting pressures, determining an average pressure having a stress ratio $\alpha$ of 0.5 to 1.0 as a forming pressure from the first forming pressure calculation formula and the second forming pressure calculation formula, and determining an average value of the forming pressure calculated in the first forming pressure calculation formula and the forming pressure calculated in the second forming pressure calculation formula as the process pressure of the fluid.

This will be described in more detail as below.

Figure 6:
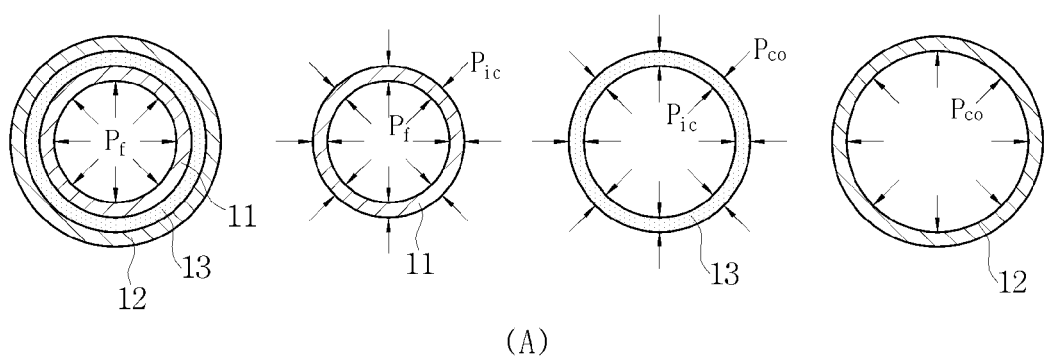
FIG. 6 is a view illustrating pressures of a fluid acting on a three-layered tube and a two-layered tube.
Figure 6:
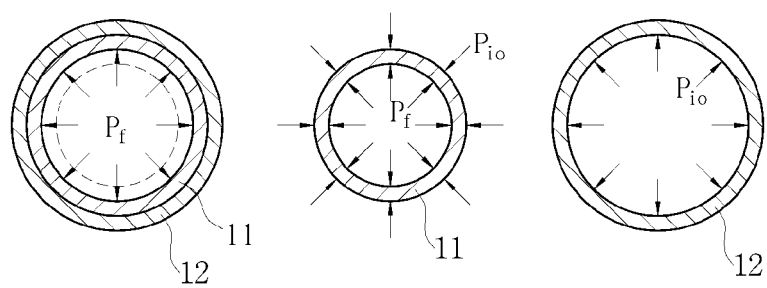

Referring to FIG. 6, pressure conditions of the inner tube 11, the intermediate tube 13, and the outer tube 12 are as below, the inner tube: $P_f - P_{ic}$
the intermediate tube: $P_{ic} - P_{co}$
the outer tube: $P_{co}$ or $P_{io}$ wherein, $P_f$ refers to the process pressure of the fluid applied into the inner tube, $P_{ic}$ refers to a contact pressure generated between the inner tube and the intermediate tube, $P_{co}$ refers to a contact pressure generated between the intermediate tube and the outer tube, and $P_{io}$ refers to a contact pressure generated between the inner tube and the outer tube.

A pressure at which a yield occurs is a pressure at which the tube begins plastic deformation, and the yield starting pressure of each tube layer is calculated as follows, the yield starting pressure of the outer tube:

$$P_y^o = (P_{io} \text{ or } P_{co}) = \frac{\sigma_y^o}{\sqrt{1 - \alpha^o + (\alpha^o)^2}} \frac{2t_o^o}{d_o^o - t_o^o}$$

the yield starting pressure of the intermediate tube:

$$P_y^c = (P_{ic})_y - (P_{co})_y = \frac{\sigma_y^c}{\sqrt{1 - \alpha^c + (\alpha^c)^2}} \frac{2t_o^c}{d_o^c - t_o^c}$$

the yield starting pressure of the inner tube:

$$P_y^i = (P_f)_y - (P_{io} \text{ or } P_{ic}) = \frac{\sigma_y^i}{\sqrt{1 - \alpha^i + (\alpha^i)^2}} \frac{2t_o^i}{d_o^i - t_o^i}$$

wherein, $\sigma_y$ refers to a yield stress, $d_0$ refers to an initial diameter of the tube, and $t_0$ refers to an initial thickness of the tube. Here, $\sigma_y$ refers to the yield stress, and among superscripts of each parameter, i relates to the inner tube, c relates to the intermediate tube, and o relates to the outer tube.

By summarizing equations of the above-described yield starting pressures, the yield starting pressures of the two-layered tube laminate and the three-layered tube laminate are summarized as follows, the two-layered tube laminate:

$$(P_f)_y = \frac{\sigma_y^i}{\sqrt{1 - \alpha^i + (\alpha^i)^2}} \frac{2t_o^i}{d_o^i - t_o^i} + \frac{\sigma_y^o}{\sqrt{1 - \alpha^o + (\alpha^o)^2}} \frac{2t_o^o}{d_o^o - t_o^o}$$

the three-layered tube laminate:

$$(P_f)_y = \frac{\sigma_y^i}{\sqrt{1 - \alpha^i + (\alpha^i)^2}} \frac{2t_o^i}{d_o^i - t_o^i} + \frac{\sigma_y^c}{\sqrt{1 - \alpha^c + (\alpha^c)^2}} \frac{2t_o^c}{d_o^c - t_o^c} + \frac{\sigma_y^o}{\sqrt{1 - \alpha^o + (\alpha^o)^2}} \frac{2t_o^o}{d_o^o - t_o^o}$$

wherein, $\alpha$ refers to a stress ratio.

By using the yield starting pressures, the forming pressures of the outer tube 12, the intermediate tube 13, and the inner tube 11 are summarized as follows, the outer tube:

$$P_i^o = P_{io} \text{ or } P_{co} =$$

$$t_o^o K^o \left( \frac{1}{d_i^o - t_i^o} \right) \left( \frac{2}{2 - \alpha^o} \right)^{n^o} \left( \sqrt{1 - \alpha^o + (\alpha^o)^2} \right)^{n^o - 1} \left( \ln \frac{d_i^o - t_i^o}{d_o^o - t_o^o} \right)^{n^o - 1}$$

the intermediate tube:

$$P_i^c = P_{ic} - P_{co} =$$

$$t_o^c K^c \left( \frac{1}{d_i^c - t_i^c} \right) \left( \frac{2}{2 - \alpha^c} \right)^{n^c} \left( \sqrt{1 - \alpha^c + (\alpha^c)^2} \right)^{n^c - 1} \left( \ln \frac{d_i^c - t_i^c}{d_o^c - t_o^c} \right)^{n^c - 1}$$

the inner tube:

$$P_i^i = P_f - (P_{io} \text{ or } P_{ic}) =$$

$$2t_i^i K^i \left(\frac{1}{d_i^i - t_i^i}\right)\left(\frac{2}{2-\alpha^i}\right)^{n^i} \left(\sqrt{1-\alpha^i+(\alpha^i)^2}\right)^{n^i-1} \left(\ln\frac{d_i^i - t_i^i}{d_o^i - t_o^i}\right)^{n^i-1}.$$

By summarizing the above-described three equations, the forming pressures of the two-layered tube laminate and the three-layered tube laminate are summarized as follows, the two-layered tube laminate:

$$P_f = 2t_i^i K^i \left(\frac{1}{d_i^i - t_i^i}\right)\left(\frac{2}{2-\alpha^i}\right)^{n^i} \left(\sqrt{1-\alpha^i+(\alpha^i)^2}\right)^{n^i-1} \left(\ln\frac{d_i^i - t_i^i}{d_o^i - t_o^i}\right)^{n^i-1} +$$

$$2t_i^o K^o \left(\frac{1}{d_i^o - t_i^o}\right)\left(\frac{2}{2-\alpha^o}\right)^{n^o} \left(\sqrt{1-\alpha^o+(\alpha^o)^2}\right)^{n^o-1} \left(\ln\frac{d_i^o - t_i^o}{d_o^o - t_o^o}\right)^{n^o-1}$$

the three-layered tube laminate:

$$P_f = 2t_i^i K^i \left(\frac{1}{d_i^i - t_i^i}\right)\left(\frac{2}{2-\alpha^i}\right)^{n^i} \left(\sqrt{1-\alpha^i+(\alpha^i)^2}\right)^{n^i-1} \left(\ln\frac{d_i^i - t_i^i}{d_o^i - t_o^i}\right)^{n^i-1} +$$

$$2t_i^c K^c \left(\frac{1}{d_i^c - t_i^c}\right)\left(\frac{2}{2-\alpha^c}\right)^{n^c} \left(\sqrt{1-\alpha^c+(\alpha^c)^2}\right)^{n^c-1} \left(\ln\frac{d_i^c - t_i^c}{d_o^c - t_o^c}\right)^{n^c-1} +$$

$$2t_i^o K^o \left(\frac{1}{d_i^o - t_i^o}\right)\left(\frac{2}{2-\alpha^o}\right)^{n^o} \left(\sqrt{1-\alpha^o+(\alpha^o)^2}\right)^{n^o-1} \left(\ln\frac{d_i^o - t_i^o}{d_o^o - t_o^o}\right)^{n^o-1}.$$

Figure 7:
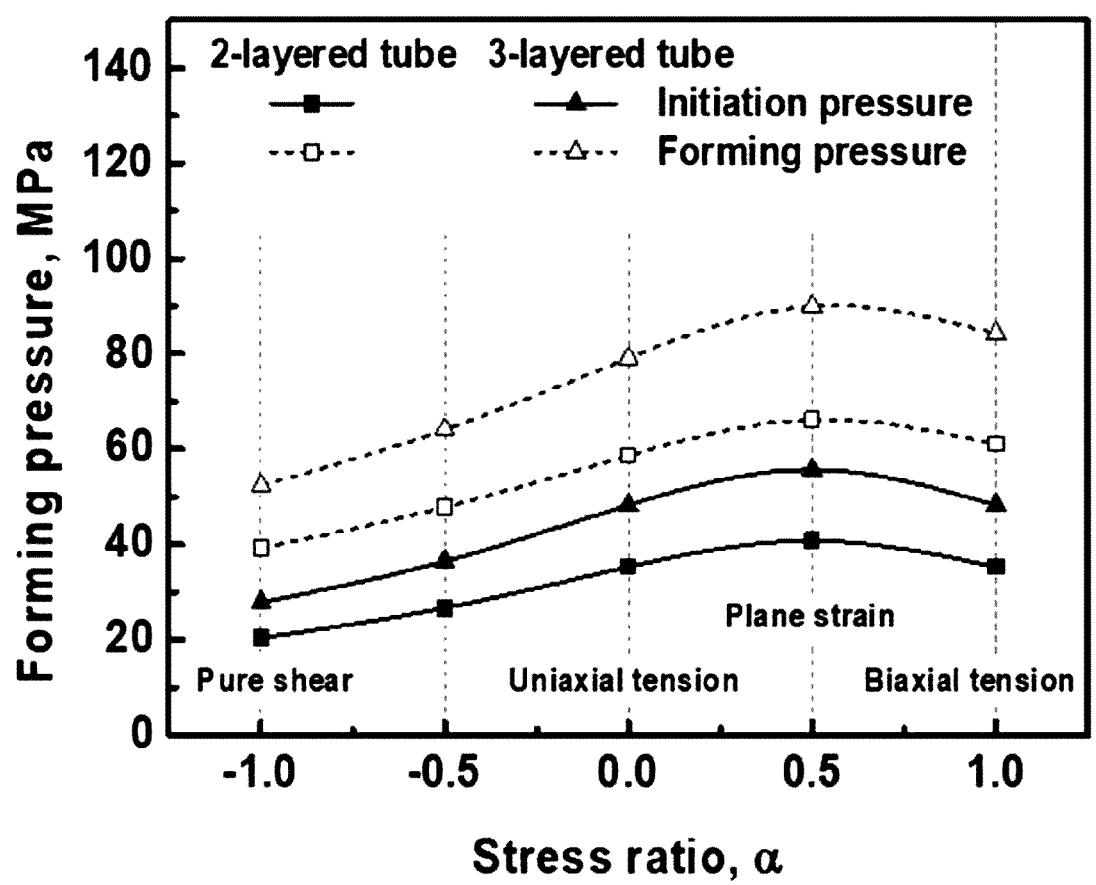
FIG. 7 is a graph showing process pressures of the fluid according to changes in a stress ratio acting on the three-layered tube and the two-layered tube.

By using the equations for the forming pressures, internal pressures according to the stress ratio α are schematically shown in FIG. 7. Through FIG. 7, a minimum forming pressure is obtained in a case of a pure shear state (α=−1), and a maximum forming pressure is obtained in a case of a plane strain state (α=0.5). Since the stress ratio α exists between 0.5 and 1 during the actual hydroforming process, the average pressure between α=0.5 and α=1 is regarded as a maximum load in a free bulging stage, that is, immediately before the tube comes into contact with the cavity of the mold. FIG. 7 shows that the forming pressures of the two-layered tube and the three-layered tube are 63.6 MPa and 87.1 MPa, respectively. In the case of the tailor-layered tube of the present disclosure, since the two-layered tube and the three-layered tube are mixed, 75.3 MPa, that is the average value, is applied.

Figure 8:
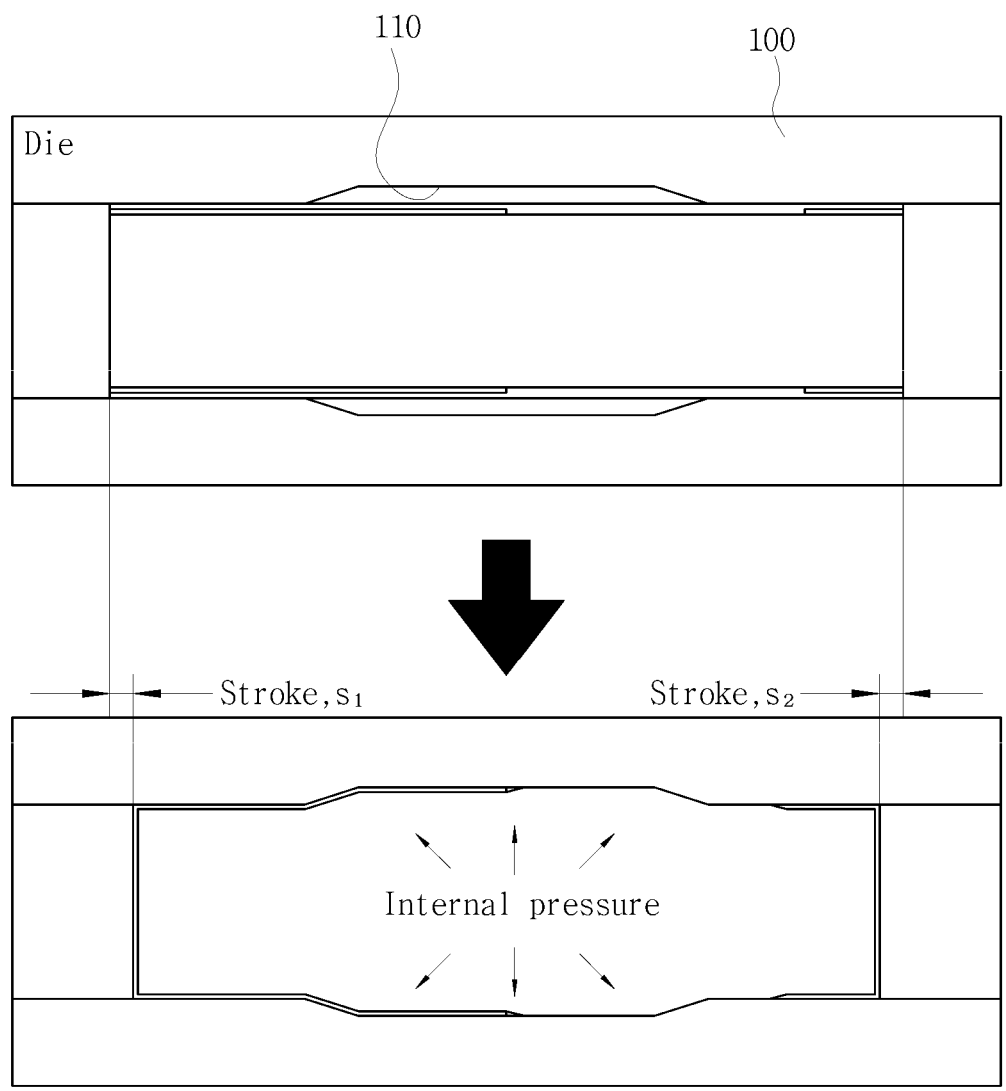
FIG. 8 is a view illustrating an example of measuring a size of a contraction stroke, which occurs when a hydroforming process is performed without axial feeding, through a finite element analysis.

Further, it is necessary to feed both ends of the tube laminate in an axial direction to prevent leakage from being occurred while hydroforming the tailor-layered tube. Appropriate axial feeding needs to be applied to the extent that both ends of the tube laminate are contracted to prevent the leakage from being occurred during the process. That is, when the amount of feed is made smaller than a $S_{total}$ value, which is the sum of the contraction strokes at both ends $S_1$ and $S_2$, the leakage occurs, and thus, the axial load over $S_{total}$ should be applied (see FIG. 8).

The appropriate amount of feed during the tube hydroforming may be measured through the method of measuring the degree of contraction of both ends of the tube after proceeding the forming without applying the axial feeding.

Specifically, the load for the axial feeding, which is applied during the hydroforming of the tailor-layered tube, is calculated by a finite element analysis of $S_1$ and $S_2$ which are the distances at which both end portions of the two-layered tube laminate and the three-layered tube laminate are contracted as only the internal pressure of the fluid is applied to the interior of the tube in a state in which no axial direction load for the axial feeding is applied to end portions of the tube.

Table 1 is an example of contract distances $S_1$ and $S_2$ for two-layered tube laminate and three-layered tube laminate calculated by the finite element analysis.

TABLE 1

|  | $S_1$(mm) | $S_2$(mm) | $S_{total}$(mm) |
| --- | --- | --- | --- |
| Two-layered Tube | 5.24 | 5.23 | 10.47 |
| Three-layered Tube | 3.24 | 3.22 | 6.46 |

Figure 9:
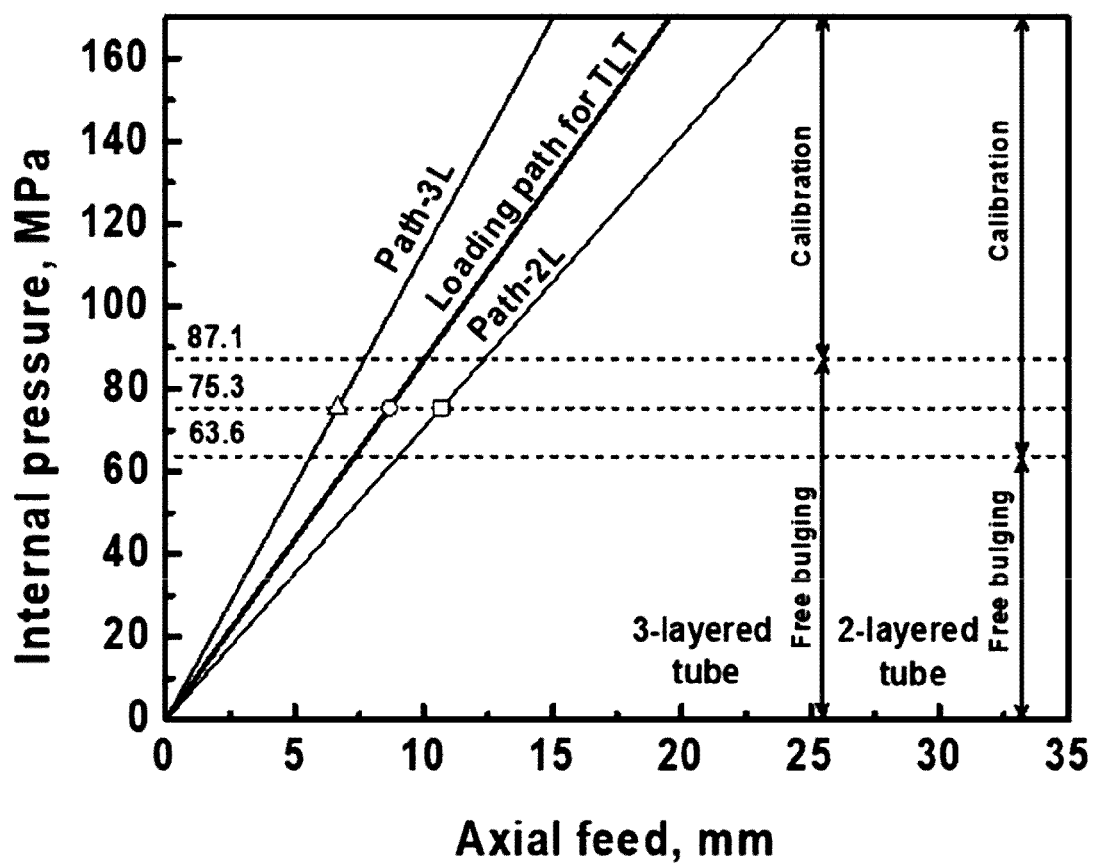
FIG. 9 is a graph showing an example of calculating an optimal load path for the hydroforming process of the tailor-layered tube according to the present disclosure.

In addition, Path-2L and Path-3L, which are load paths of the two-layered tube laminate and the three-layered tube laminate, are calculated as shown in FIG. 9 using the calculated distances $S_1$ and $S_2$ in Table 1 and the process pressures of the fluid in FIG. 7.

Since the tailor-layered tube has a mixed structure of the two-layered tube and the three-layered tube, the tailor-layered tube should have a value between the strokes of the two-layered tube and the three-layered tube. Thus, the path having the average value of the load paths Path-2L and Path-3L is determined and applied as an optimal load path for the hydroforming process of the tailor-layered tube.

Figure 10:
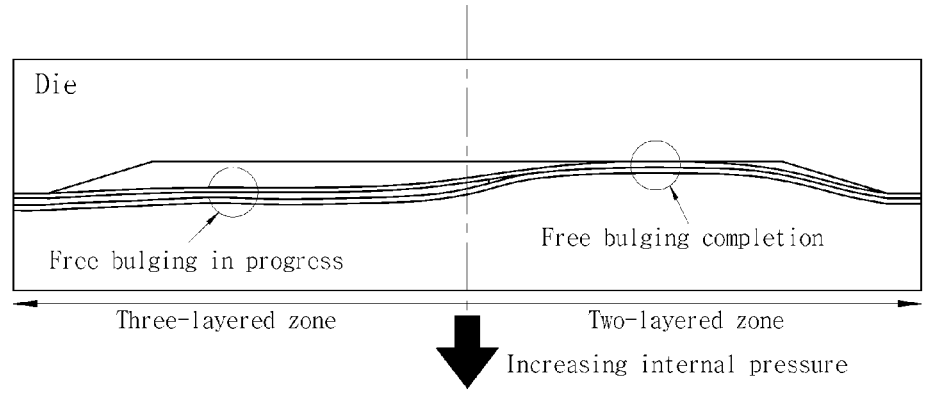
FIG. 10 is a view illustrating deformation behaviors of the tailor-layered tubes of the first and second embodiments in a free bulging stage, when the hydroforming is in progress without an axial direction load, through finite element analysis.
Figure 10:
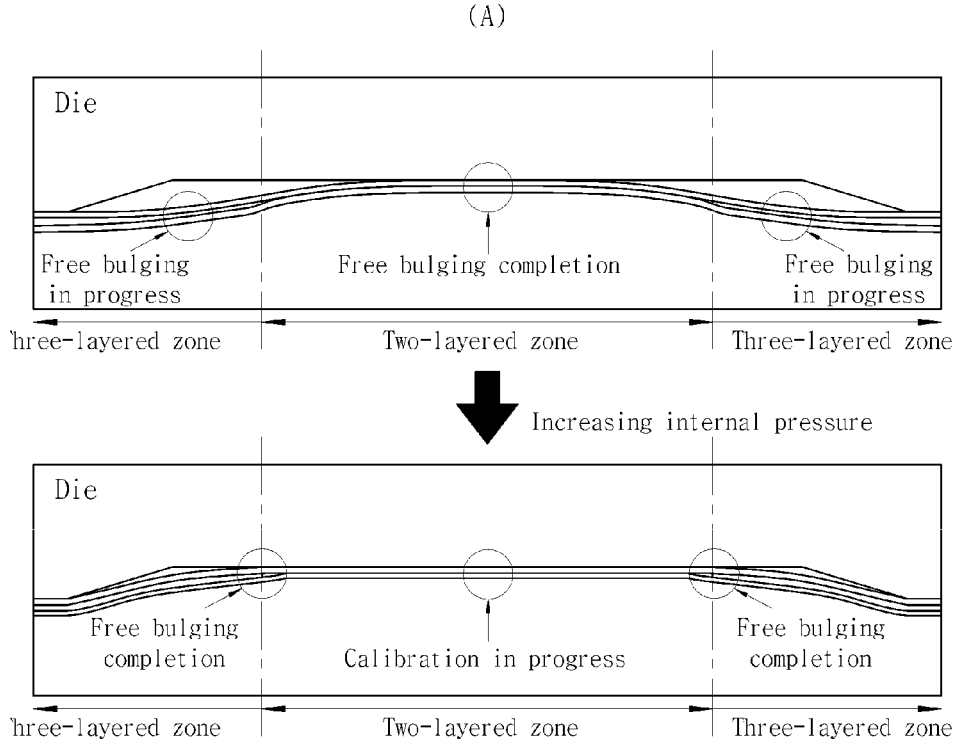

FIG. 10 illustrates a deformation behavior in the free bulging stage when the hydroforming is in progress without the axial direction load for axial feeding, FIG. 10A illustrates a deformation behavior of the first embodiment shown in FIG. 5A, and FIG. 10B illustrates a deformation behavior of the second embodiment shown in FIG. 5B.

In both the first and second embodiments, the two-layered zone first comes into contact with an interior wall of a die, and the free bulging is completed. In the case of the three-layered zone, the bulging is progressing continuously. As the pressure gradually increases, the two-layered zone enters a calibration stage, and the three-layered zone comes into contact with the interior wall of the cavity of the mold, thereby completing the free bulging.

In order to demonstrate the effect of the optimal load path, hydroforming experiments are conducted on a tailor-layered tube made of stainless steel according to the load paths Path-3L and Path-2L of FIG. 9, and as a result of the experiments, the leakage occurs in the load path Path-3L before the process is completed, and the three-layered zone is hardly formed compared with the two-layered zone. That is, it may be seen that sufficient forming is not achieved in both the first and second embodiments.

And it is confirmed that wrinkle occurs between the three-layered zone and the two-layered zone of the load path Path-2L. This is because more deformation is concentrated in the two-layered zone due to excessive axial transport.

As a result of the hydroforming experiments according to the optimal load path between the load paths Path-3L and Path-2L, it is confirmed that both the first and second embodiments are successfully formed without defects.

Figure 11:
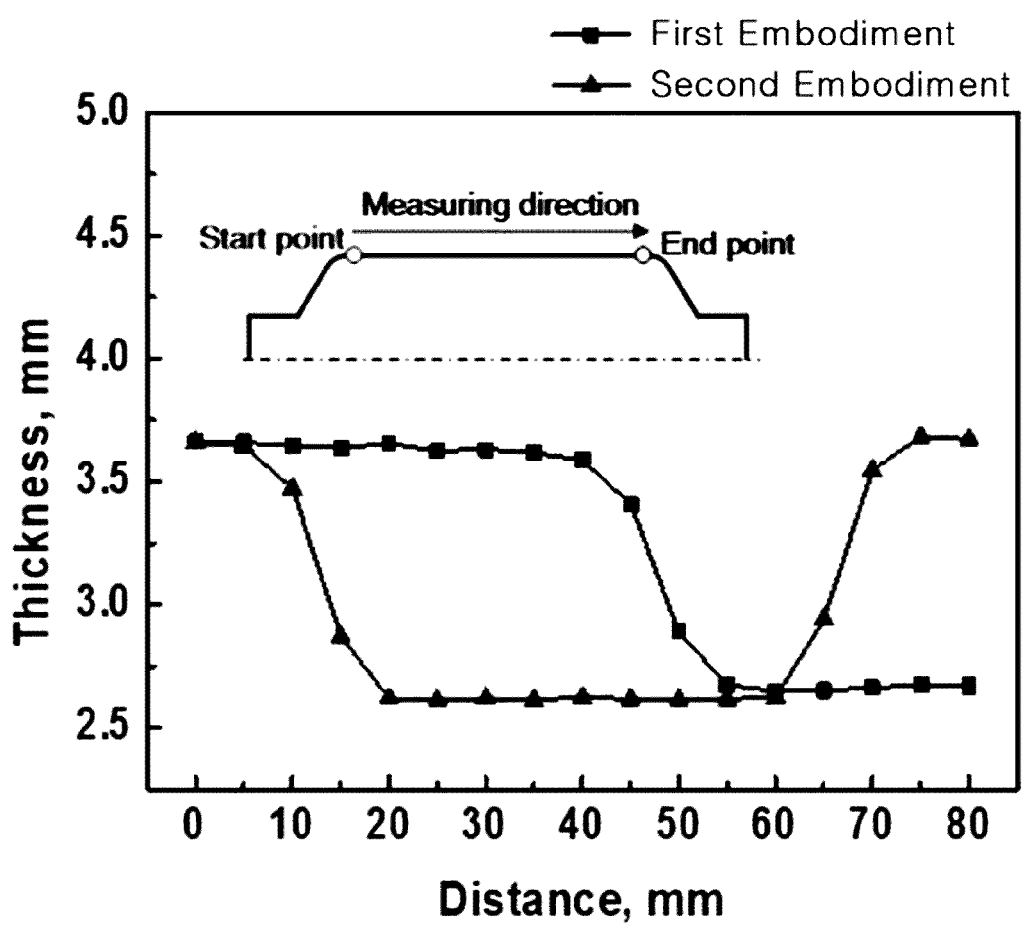
FIG. 11 is a graph illustrating changes in thickness of the tailor-layered tubes during hydroforming, according to the first and second embodiments of the present disclosure.

FIG. 11 is a graph showing changes in thickness during the hydroforming according to the first and second embodiments shown in FIGS. 5A and 5B through the experiments. In the case of the first embodiment, the average thickness is 3.65 mm for the three-layered zone and 2.64 mm for the two-layered zone. In the case of the second embodiment, the average thickness is 3.66 mm for the three-layered zone and 2.61 mm for the two-layered zone. It may be seen that the thickness may be selectively controlled by optimizing the combination of the tubes as shown in FIG. 11.

As described above, according to the present disclosure, it is possible to manufacture the tailor-layered tube having locally different thicknesses by only the hydroforming process without performing a welding operation.

Further, it may also be seen that the hydroforming process may be performed without shape defects through an optimal load path design.

According to the present disclosure, at least one intermediate tube can be locally disposed between an inner tube and an outer tube and hydroformed to manufacture a tailor-layered tube having locally different thicknesses. Thus, the tailor-layered tube having different thicknesses can be locally manufactured by only a hydroforming process without performing welding, thereby eliminating the possibility of defects or damages due to the presence of welded portions.

Further, a hydroforming process can be performed without shape defects through an optimal load path design.

While the present disclosure has been described with reference to the embodiments, it should be understood that various substitutions, additions, and modifications can be made by those skilled in the art without departing from the spirit and scope of the present disclosure, and it is to be understood that such modified embodiments also fall within the scope of protection of the present disclosure as defined by the claims attached below.

What is claimed is:

1. A method of manufacturing a tailor-layered tube, the method comprising:

inserting an inner tube into an outer tube and inserting an intermediate tube between the outer tube and the inner tube to align at a predetermined position, the intermediate tube having a length different from a length of the inner tube and a length of the outer tube;

placing a laminate of the outer tube, the inner tube and the intermediate tube in a cavity of a mold; and supplying a fluid to an inside of the inner tube through one side portion of the cavity of the mold at a constant process pressure so that a pressure is applied to an inner peripheral surface of the inner tube, and simultaneously applying axial direction loads for axial feeding to both end portions of the laminate to perform a hydroforming operation, wherein, during the hydroforming operation, the inner tube, the intermediate tube, and the outer tube are hydroformed in a state of being laminated so that the inner tube, the intermediate tube, and the outer tube are sequentially brought into close contact with each other in a region where the intermediate tube is disposed and the inner tube is brought into direct contact with the outer tube in a region where the intermediate tube does not exist.

2. The method of claim 1, wherein the constant process pressure of the fluid supplied in the supplying the fluid is obtained by sequentially performing operations of calculating yield starting pressures at which the inner tube, the intermediate tube, and the outer tube respectively start plastic deformation, determining a first forming pressure calculation formula of a two-layered tube laminate and a second forming pressure calculation formula of a three-layered tube laminate from the yield starting pressures, determining an average pressure having a stress ratio $\alpha$ of 0.5 to 1.0 as a forming pressure from the first forming pressure calculation formula and the second forming pressure calculation formula, and determining an average value of the forming pressure calculated in the first forming pressure calculation formula and the forming pressure calculated in the second forming pressure calculation formula as the process pressure of the fluid.

3. The method of claim 2, wherein the axial direction load applied in the supplying the fluid is obtained by sequentially performing operations of calculating $S_1$ and $S_2$ which are distances at which both end portions of the two-layered tube laminate and the three-layered tube laminate are contracted as only an internal pressure of the fluid is applied to an interior of the tube in a state in which no axial direction load for axial feeding is applied to end portions of the tube, calculating Path-2L and Path-3L, which are load paths of the two-layered tube laminate and the three-layered tube laminate, using the calculated distances $S_1$ and $S_2$ and the process pressures, and determining a path having an average value of the load paths Path-2L and Path-3L as an optimal load path.

* * * * *